(12) United States Patent
Tanaka et al.

(10) Patent No.: US 11,592,077 B2
(45) Date of Patent: Feb. 28, 2023

(54) VIBRATION DAMPING DEVICE

(71) Applicants: SUMITOMO RIKO COMPANY LIMITED, Komaki (JP); HONDA MOTOR CO., LTD., Tokyo (JP)

(72) Inventors: Shingo Tanaka, Komaki (JP); Ryuichi Ando, Komaki (JP); Kenji Oki, Komaki (JP); Yusuke Arai, Tokyo (JP); Keisuke Kawabe, Tokyo (JP)

(73) Assignees: SUMITOMO RIKO COMPANY LIMITED, Komaki (JP); HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 17/383,536

(22) Filed: Jul. 23, 2021

(65) Prior Publication Data
US 2022/0065325 A1     Mar. 3, 2022

(30) Foreign Application Priority Data

Aug. 28, 2020   (JP) .............................. JP2020-144352

(51) Int. Cl.
*F16F 13/08*     (2006.01)
*F16F 13/10*     (2006.01)
*B60K 5/12*      (2006.01)

(52) U.S. Cl.
CPC .......... *F16F 13/085* (2013.01); *B60K 5/1208* (2013.01); *F16F 13/108* (2013.01); *F16F 2224/025* (2013.01)

(58) Field of Classification Search
CPC .. F16F 13/035; F16F 13/108; F16F 2224/025; B60K 5/1208
See application file for complete search history.

(56) References Cited

U.S. PATENT DOCUMENTS

| | | | |
|---|---|---|---|
| 9,593,732 B2 | 3/2017 | Thierry et al. | |
| 2004/0021259 A1* | 2/2004 | Visage | F16F 13/108 267/140.13 |
| 2020/0217391 A1 | 7/2020 | Kadowaki | |

FOREIGN PATENT DOCUMENTS

| | | | | |
|---|---|---|---|---|
| JP | 2018-162824 A | 10/2018 | | |
| WO | WO-2019233659 A1 * | 12/2019 | ........... | B60K 5/1208 |

* cited by examiner

*Primary Examiner* — Melanie Torres Williams
(74) *Attorney, Agent, or Firm* — Oliff PLC

(57) ABSTRACT

A vibration damping device including a vibration-damping device main unit attached to a bracket from a lateral side by a second attachment member being fitted to opposed walls provided on widthwise opposite sides of the bracket. The bracket includes flexible latches extending from the respective opposed walls forward in a direction of attachment. The second attachment member includes outer recesses respectively opening onto surfaces overlapped with the respective opposed walls. Each latch has a slope portion sloping inward in a width direction of the bracket such that a distal end face of the latch is inserted in the corresponding outer recess. The distal end face of the latch is latched by a forward wall inner face of the outer recess, and displacement of the second attachment member relative to the bracket in a direction of dislodgment opposite to the direction of attachment is limited.

7 Claims, 11 Drawing Sheets

VIBRATION DAMPING DEVICE

INCORPORATED BY REFERENCE

The disclosure of Japanese Patent Application No. 2020-144352 filed on Aug. 28, 2020 including the specification, drawings and abstract is incorporated herein by reference in its entirety.

BACKGROUND OF THE INVENTION

1. Field of the Invention

The present invention relates to a vibration damping device for use in, for example, an automotive engine mount or the like.

2. Description of the Related Art

Conventionally, a vibration damping device in which a first attachment member and a second attachment member are connected by a main rubber elastic body is used, for example, in an engine mount for a vehicle. As shown in U.S. Publication No. US 2020/0217391, the vibration damping device is such that a second attachment member is attached to the vehicle via a bracket. The second attachment member and the bracket are assembled by fitting parts provided on widthwise opposite sides of the second attachment member being respectively fitted from the lateral side into fitting grooves formed in opposed walls on widthwise opposite sides of the bracket.

SUMMARY OF THE INVENTION

Meanwhile, in the case of such a vibration damping device of lateral-insertion type, it is necessary to reliably prevent the second attachment member from moving to the opposite side of the direction of attachment with respect to the bracket and becoming dislodged. Therefore, in US 2020/0217391, a hook part provided to the second attachment member is inserted into a locking hole of the bracket and is locked in place, thereby restricting the movement of the second attachment member with respect to the bracket.

However, in the structure of US 2020/0217391, when a force is applied to the hook part due to the second attachment member moving in the direction of dislodgment with respect to the bracket, the arm part supporting the hook part is easily deformed in the direction of dislodgment of the hook part from the locking hole. If the input is unexpectedly large, resistance to dislodgement cannot be sufficiently exerted, and there is a risk that the hook part and the locking hole may be unlocked.

It is therefore one object of this invention to provide a vibration damping device of novel structure which is able to prevent the second attachment member from becoming dislodged from the bracket with a higher degree of reliability.

Hereinafter, preferred embodiments for grasping the present invention will be described. However, each preferred embodiment described below is exemplary and can be appropriately combined with each other. Besides, a plurality of elements described in each preferred embodiment can be recognized and adopted as independently as possible, or can also be appropriately combined with any element described in other preferred embodiments. By so doing, in the present invention, various other preferred embodiments can be realized without being limited to those described below.

A first preferred embodiment provides a vibration damping device comprising: a vibration-damping device main unit comprising a first attachment member and a second attachment member connected by a main rubber elastic body; a bracket attached to the vibration-damping device main unit and including a pair of opposed walls provided on opposite sides in a width direction of the bracket; a pair of fitting grooves provided to the respective opposed walls of the bracket; and a pair of fitting parts provided on opposite sides in a width direction of the second attachment member, the fitting parts being fitted in the respective fitting grooves such that the vibration-damping device main unit is attached to the bracket from a lateral side, wherein the bracket includes latches having flexibility and respectively extending from opposed inner faces of the respective opposed walls forward in a direction of attachment of the vibration-damping device main unit to the bracket, the second attachment member includes outer recesses respectively opening onto surfaces overlapped with the respective opposed walls, each of the latches has a slope portion sloping inward in the width direction of the bracket toward a distal end of the latch such that a distal end face of the latch is inserted in the corresponding outer recess, and the distal end face of the latch is latched by a forward wall inner face of the corresponding outer recess, and displacement of the second attachment member relative to the bracket in a direction of dislodgment opposite to the direction of attachment is limited.

According to the vibration damping device structured following the present preferred embodiment, when the vibration-damping device main unit is about to become dislodged from the bracket, the dislodgment will be prevented by the latch, which extends forward from the bracket with the slope portion, being inserted into the outer recess of the second attachment member and the distal end face of the latch being latched by the forward inner wall surface of the outer recess.

A contact reaction force acting on the distal end face of the latch acts on the latch primarily as a compression force in the direction of extension because the tilting motion due to the deformation of the slope portion of the latch is restricted by the outer recess. Therefore, resistance to dislodgement of the vibration-damping device main unit from the bracket is more largely exerted due to the latch bracing itself.

A second preferred embodiment provides the vibration damping device according to the first preferred embodiment, wherein a distal end portion of each latch extending from the corresponding opposed wall extends straightly forward parallel to the direction of attachment, and a proximal end portion of the latch comprises the slope portion.

According to the vibration damping device structured following the present preferred embodiment, the slope portion is provided at the proximal end portion of the latch, whereby the distal end portion of the latch is inserted into the outer recess. The distal end portion of the latch inserted into the outer recess extends straightly in the direction of attachment of the vibration-damping device main unit to the bracket, so that the contact reaction force against the outer recess acting on the distal end face of the latch is likely to act on the latch as a compression force in the direction of extension. Therefore, the resistance to dislodgement of the vibration-damping device main unit from the bracket is largely exerted due to the latch bracing itself.

A third preferred embodiment provides the vibration damping device according to the first or second preferred embodiment, wherein a clearance recess is provided to a bottom face of each of the fitting grooves of the respective opposed walls, and each latch is positioned at the clearance recess.

According to the vibration damping device structured following the present preferred embodiment, when the vibration-damping device main unit is attached to the bracket, deformation of the latch is allowed by the clearance recess. Therefore, the resistance during the wall on the forward side of the outer recess climbing over the latch is reduced, thereby reducing the force required to assemble the vibration-damping device main unit and the bracket.

A fourth preferred embodiment provides the vibration damping device according to any one of the first through third preferred embodiments, wherein each latch is made thicker in a proximal end on a side of the corresponding opposed wall than in the distal end.

According to the vibration damping device structured following the present preferred embodiment, in the latch, the proximal end, in which distortion due to the compression force in the direction of extension is likely to be large, is made thicker, thereby improving strength of the proximal end of the latch. Besides, since the latch is made thinner in the distal end than in the proximal end, the distal end of the latch readily deforms. Thus, when the vibration-damping device main unit is attached to the bracket, the wall on the forward side of the outer recess easily climbs over the latch, thereby facilitating attachment of the vibration-damping device main unit to the bracket.

A fifth preferred embodiment provides the vibration damping device according to any one of the first through fourth preferred embodiments, wherein a stopper face configured to limit an amount of deformation of each latch due to contact of the latch is constituted by a concave bottom face of the corresponding outer recess.

According to the vibration damping device structured following the present preferred embodiment, the deformation of the latch inserted into the outer recess can be limited over a wide range by contact with the concave bottom face of the outer recess. Therefore, the deformation of the latch is suppressed when the latch braces itself, and the resistance to dislodgement due to the distal end face of the latch coming into contact with the forward wall inner face of the outer recess is efficiently exhibited, thereby avoiding damage to the latch caused by its excessive deformation.

A sixth preferred embodiment provides the vibration damping device according to any one of the first through fifth preferred embodiments, wherein the distal end of each latch has a projection projecting toward a concave bottom side of the corresponding outer recess, and in addition to the distal end face of the latch, the projection is latched by the forward wall inner face of the corresponding outer recess.

According to the vibration damping device structured following the present preferred embodiment, in addition to the distal end face of the latch, the projection is latched by the forward wall inner face of the outer recess, thereby more effectively preventing dislodgment of the vibration-damping device main unit from the bracket.

A seventh preferred embodiment provides the vibration damping device according to any one of the first through sixth preferred embodiments, wherein the distal end face of each latch is latched by the forward wall inner face of the corresponding outer recess on a center axis of the latch.

According to the vibration damping device structured following the present preferred embodiment, the contact reaction force acting on the latch due to the distal end face of the latch being latched by the forward wall inner face of the outer recess is efficiently exerted on the latch as the compression force in the direction of extension.

According to the present invention, in the vibration damping device of lateral-insertion type, it is possible to prevent the second attachment member from becoming dislodged from the bracket with higher reliability.

BRIEF DESCRIPTION OF THE DRAWINGS

The foregoing and/or other objects, features and advantages of the invention will become more apparent from the following description of practical embodiments with reference to the accompanying drawings in which like reference numerals designate like elements and wherein.

DETAILED DESCRIPTION OF EMBODIMENTS

Practical embodiments of the present invention will be described below in reference to the drawings.

Figure 3:
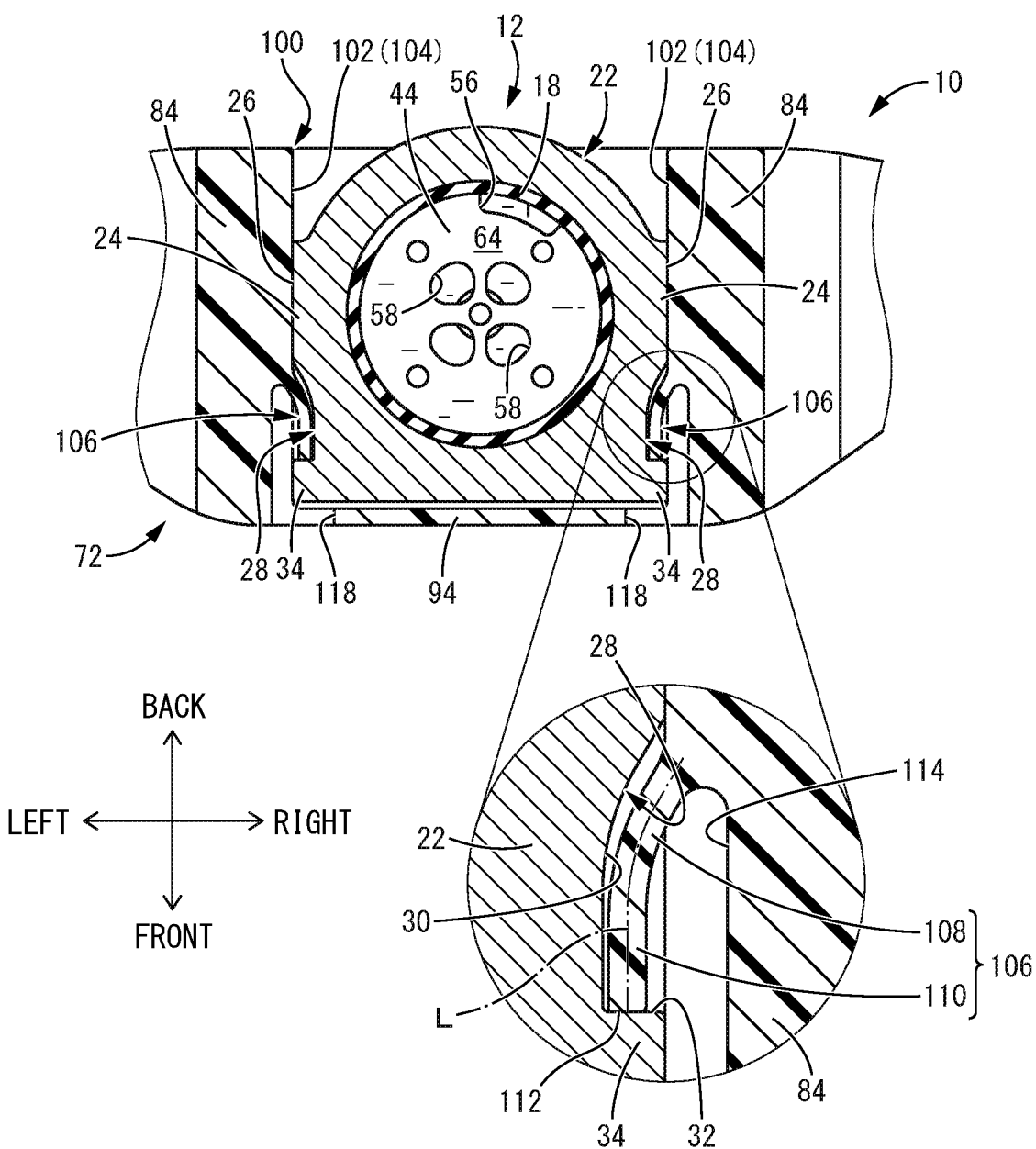
FIG. 3 is a transverse cross-sectional view of the engine mount shown in FIG. 1.
Figure 4:
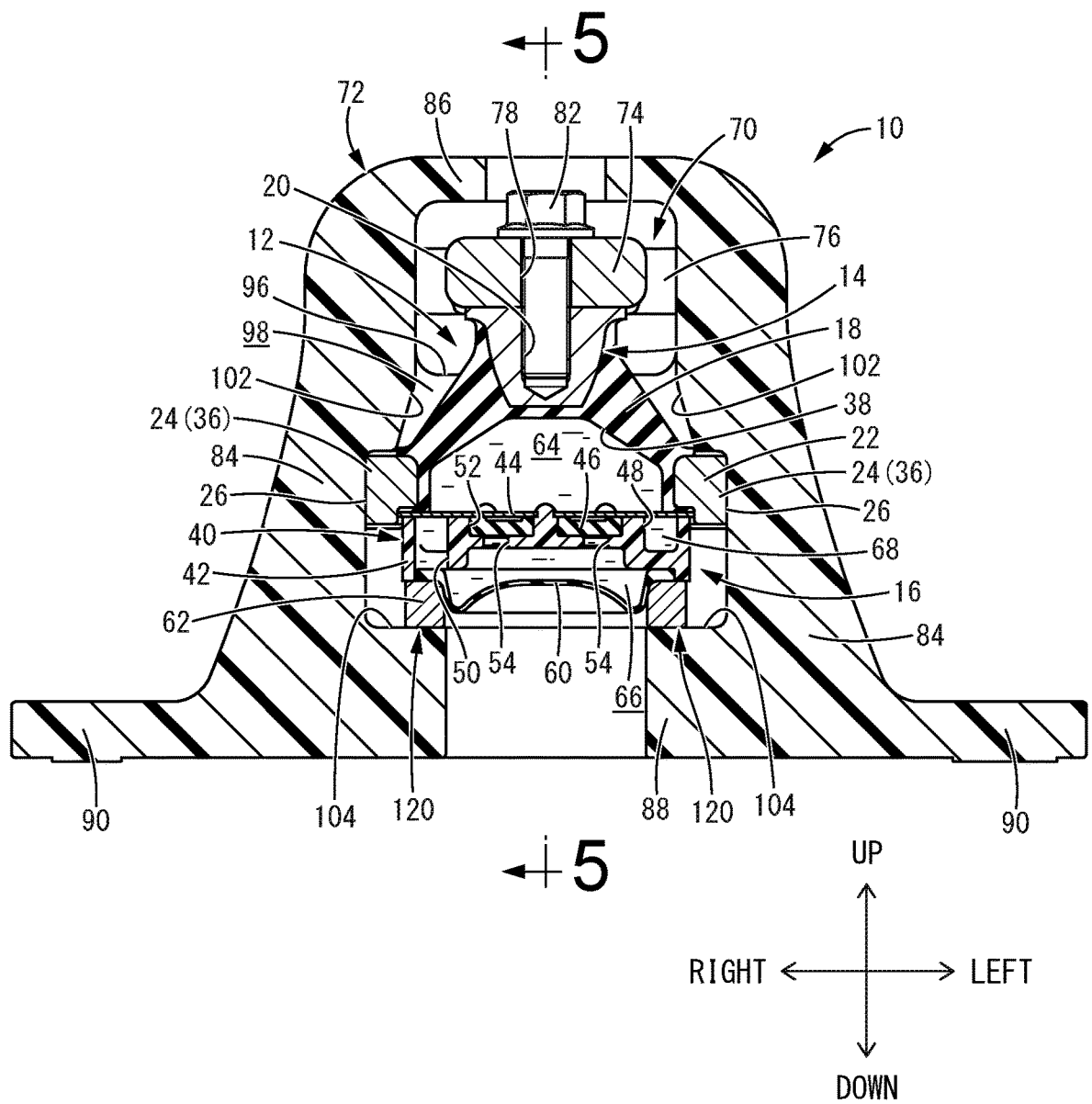
FIG. 4 is a vertical cross-sectional view of the engine mount shown in FIG. 1, which is equivalent to a cross-sectional view taken along line 4-4 of FIG. 5.
Figure 5:
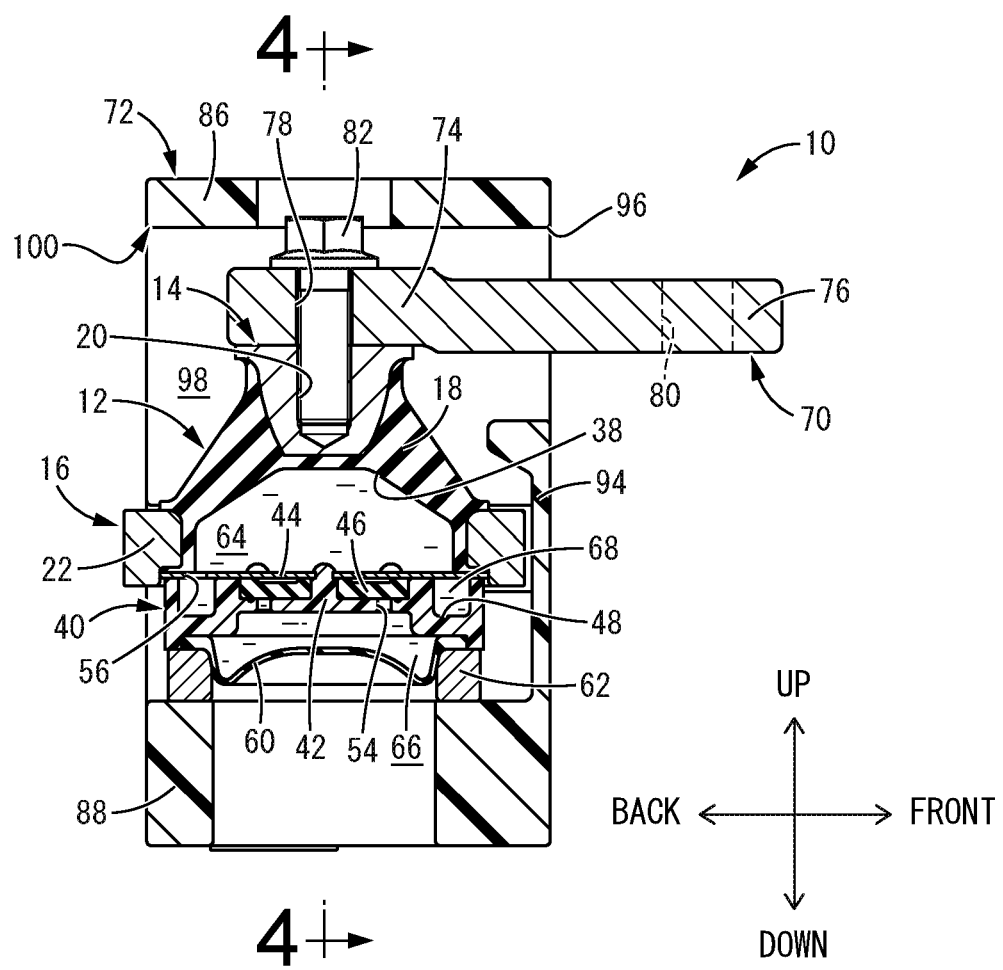
FIG. 5 is a cross-sectional view taken along line 5-5 of FIG. 4.
Figure 6:
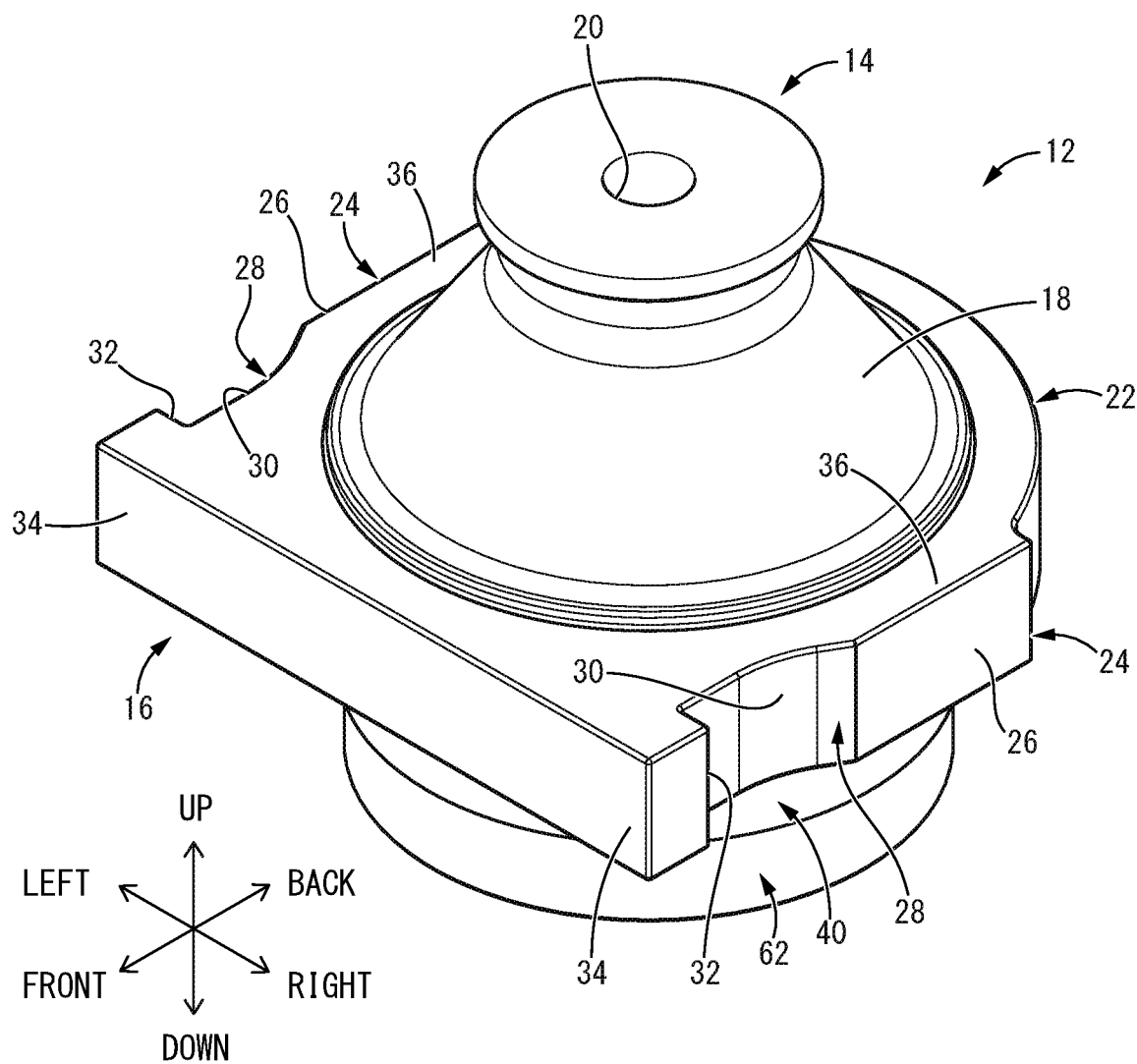
FIG. 6 is a perspective view of a mount main unit constituting the engine mount shown in FIG. 1.

Referring first to FIGS. 1 to 5, there is depicted an automotive engine mount 10 as a first practical embodiment of a vibration damping device according to the present invention. The engine mount 10 includes a mount main unit 12 serving as a vibration-damping device main unit. As shown in FIGS. 4 to 6, the mount main unit 12 has a structure in which a first attachment member 14 and a second attachment member 16 are connected by a main rubber elastic body 18. In the following description, as a general rule, the vertical direction refers to the vertical direction in FIG. 4, which coincides with the mount center axis direction, and the left-right direction refers to the left-right direction in FIG. 3, which coincides with the width direction of an outer bracket 72 to be described later. Besides, as a general rule, the front-back direction refers to the vertical direction in FIG. 3, the front (forward) refers to downward in FIG. 3, and the back (backward) refers to upward in FIG. 3. In addition, for a plurality of identical members, reference numerals may be assigned to only a part of the members, and may be omitted from others.

The first attachment member 14 is a high rigidity component formed of metal, synthetic resin, or the like, and is a solid, round block shape as shown in FIGS. 4 and 5. The first attachment member 14 decreases in diameter toward the bottom. The first attachment member 14 has a screw hole 20 that opens onto the upper surface and extends in the vertical direction.

The second attachment member 16 includes a fastening member 22. The fastening member 22 is a high rigidity component similar to the first attachment member 14, and is annular as shown in FIG. 3. As shown in FIGS. 4 and 5, the outside peripheral portion of the fastening member 22 protrudes further downward than the inside portion so as to have a larger vertical dimension. As shown in FIGS. 3, 4, and 6, the left-right opposite ends of the fastening member 22 serve as guide parts 24. The guide parts 24 are constituted by the outside peripheral portion of the fastening member 22 whose vertical dimension is increased, and the left-right opposite surfaces serve as guide surfaces 26. Each guide surface 26 is a plane that extends generally orthogonally to the left-right direction. It is desirable that the guide surface 26 extend in the front-back direction in order to obtain an advantageous guiding action when inserting the mount main unit 12 into the outer bracket 72, which will be described later, and in the present practical embodiment, the front-back dimension of the guide surface 26 is larger than its vertical dimension.

As shown in FIG. 6, an outer recess 28 is formed in the guide part 24 of the second attachment member 16. The outer recess 28 has a groove shape that opens onto the guide surface 26 of the guide part 24 and passes through in the vertical direction. As shown in FIG. 3, the back part of a concave bottom face 30 of the outer recess 28 slopes with respect to the front-back direction, and in the back part, the depth dimension gradually increases toward the front, while the depth dimension is generally constant in the front part. The concave bottom face 30 of the outer recess 28 has a shape that corresponds to the inner surface of a latch 106 in the left-right direction, which will be described later. A forward wall inner face 32 of the outer recess 28 is a plane that extends generally orthogonally to the front-back direction. The guide part 24 includes a latching wall 34 on the front side of the outer recess 28, and a mating part 36 on the back side of the outer recess 28.

As shown in FIGS. 4 and 5, the first attachment member 14 and the fastening member 22 of the second attachment member 16 are disposed vertically apart on approximately the same center axis, and are elastically connected by the main rubber elastic body 18. The main rubber elastic body 18 has a generally frustoconical shape, and the first attachment member 14 is fastened to its upper part, which is the small-diameter side, and the fastening member 22 of the second attachment member 16 is fastened to the outer circumferential surface of its lower part, which is the large-diameter side. The main rubber elastic body 18 is, for example, bonded by vulcanization to the first attachment member 14 and the fastening member 22 of the second attachment member 16 during molding.

The main rubber elastic body 18 includes a hollow part 38 that opens downward. The hollow part 38 has a tapered shape in which the upper part of the peripheral wall becomes smaller in diameter upward. The main rubber elastic body 18 has a tapered cross-sectional shape that slopes to the outer circumference toward the bottom due to the formation of the hollow part 38.

A partition member 40, which constitutes the second attachment member 16, is attached to the fastening member 22. The partition member 40 has a generally circular disk shape overall, and has a structure in which a movable member 46 is arranged between a partition member body 42 and a lid member 44.

The partition member body 42 includes a circumferential groove 48 extending in the circumferential direction around the outer circumferential portion for a length less than once around the circumference while opening onto the upper surface. At one end of the circumferential groove 48, a lower communication hole 50 is formed so as to perforate the lower wall of the circumferential groove 48. An annular housing recess 52 is formed in the inside portion of the partition member body 42 so as to open onto the upper surface. The lower wall of the housing recess 52 is perforated by a plurality of lower through holes 54.

The lid member 44 has a thin-walled circular disk shape, and is overlapped on and fixed to the upper surface of the partition member body 42. The lid member 44 includes an upper communication hole 56 formed in the portion covering the other end of the circumferential groove 48 (see FIG. 3). As shown in FIG. 3, in the lid member 44, a plurality of upper through holes 58 are formed in the portion covering the housing recess 52.

In the housing recess 52 of the partition member body 42, as shown in FIGS. 4 and 5, the movable member 46 is housed. The movable member 46 is a rubber elastic body of generally round disk plate shape, with its radially inner end and its outer peripheral end both protruding to the upper side and being thick-walled. With the movable member 46 inserted in the housing recess 52, the lid member 44 is fixed to the partition member body 42, whereby the movable member 46 is housed in the housing recess 52 between the partition member body 42 and the lid member 44. The thick-walled radially inner end and outer peripheral end of the movable member 46 are clasped between the partition member body 42 and the lid member 44 in the vertical direction, and elastic deformation of the movable member 46 is allowed in the thickness direction radially between the radially inner end and the outer peripheral end.

A flexible film 60 formed of a thin-walled elastomer is provided below the partition member 40. The flexible film 60 has a thick-walled outer peripheral end and is overlapped with the lower surface of the partition member body 42. An annular support member 62 is overlapped with the outer peripheral end of the flexible film 60 from below, and the outer peripheral end of the flexible film 60 is clasped between the partition member body 42 and the support member 62 in the state of attachment of the mount main unit 12 to the outer bracket 72 to be described later.

The support member 62 is a member that constitutes the second attachment member 16 in the present practical embodiment, and is a high rigidity component similar to the fastening member 22. In the state of attachment of the mount main unit 12 to the outer bracket 72 to be described later, the support member 62 is configured such that the radially inner portion clasps the flexible film 60 while the outer peripheral portion is in contact with the lower surface of the partition member body 42. With this configuration, the fastening member 22, the partition member 40, and the support member 62 are mutually positioned in the vertical direction, and the second attachment member 16 of the present practical embodiment is constituted by the fastening member 22, the partition member 40, and the support member 62.

By the partition member 40 and the flexible film 60 being attached to the fastening member 22, which constitutes an integrally vulcanization molded component of the main rubber elastic body 18, a pressure-receiving chamber 64 whose wall portion is partially defined by the main rubber elastic body 18 is formed between the main rubber elastic body 18 and the partition member 40. In addition, an equilibrium chamber 66 whose wall portion is partially defined by the flexible film 60 is formed between the partition member 40 and the flexible film 60. The pressure-receiving chamber 64 and the equilibrium chamber 66 are filled with a non-compressible fluid or liquid. The non-compressible fluid is not particularly limited, but for example, water, ethylene glycol, or the like can be adopted. The non-compressible fluid may be a mixture.

The pressure-receiving chamber 64 and the equilibrium chamber 66 communicate with each other through an orifice passage 68 comprising the circumferential groove 48. The orifice passage 68 extends in the outer circumferential portion of the partition member 40 in the circumferential direction, with one end communicating with the pressure-receiving chamber 64 at the upper communication hole 56 while the other end communicating with the equilibrium chamber 66 at the lower communication hole 50. When a vibration in the vertical direction is input across the first attachment member 14 and the second attachment member 16 so that an internal pressure difference is generated between the pressure-receiving chamber 64 and the equilibrium chamber 66, fluid flow through the orifice passage 68 is produced between the pressure-receiving chamber 64 and the equilibrium chamber 66, whereby vibration damping effects such as a high attenuating action based on the flow action of the fluid will be achieved. With the orifice passage 68, the tuning frequency, which is the resonance frequency of the flowing fluid, is adjusted to the frequency of the vibration to be damped by the ratio of passage cross sectional area to passage length, and for example, the tuning frequency is set to a low frequency on the order of 10 Hz, which corresponds to engine shake.

The liquid pressure of the pressure-receiving chamber 64 and the liquid pressure of the equilibrium chamber 66 are respectively exerted on the upper and lower surfaces of the movable member 46 arranged in the housing recess 52. When a vibration in the vertical direction is input across the first attachment member 14 and the second attachment member 16 so that an internal pressure difference is generated between the pressure-receiving chamber 64 and the equilibrium chamber 66, the movable member 46 elastically deforms in the thickness direction, so as to transmit and release the liquid pressure of the pressure-receiving chamber 64 to the equilibrium chamber 66.

When a low-frequency, large-amplitude vibration is input, fluid flow through the orifice passage 68 is actively produced in a resonant state, and the vibration damping effect due to high damping is exerted. When a low-frequency, large-amplitude vibration is input, the deformation of the movable member 46 does not fully follow the input vibration, and the effect of releasing the liquid pressure due to the deformation of the movable member 46 is reduced, so that fluid flow through the orifice passage 68 is efficiently produced. When a small-amplitude vibration of medium to high frequency is input, the orifice passage 68 becomes substantially clogged due to antiresonance, but the movable member 46 actively undergoes elastic deformation in the resonant state so as to release the liquid pressure, thereby exhibiting vibration damping effect due to low dynamic spring behavior.

As shown in FIGS. 1 to 5, an inner bracket 70 and an outer bracket 72 serving as a bracket are attached to the mount main unit 12.

The inner bracket 70 is a plate-shaped member and includes a connecting part 74 that is overlapped on the upper surface of the first attachment member 14 and extends forward (to the right in FIG. 5), and an attachment part 76 integrally formed to the front of the connecting part 74. The connecting part 74 includes a bolt hole 78 that penetrate in the vertical direction in the portion that overlaps the upper surface of the first attachment member 14. The attachment part 76 protrudes to the left-right opposite sides with respect to the connecting part 74, and is penetrated by bolt holes 80, 80 in the vertical direction. By a connecting bolt 82, which is inserted through the bolt hole 78 of the connecting part 74, being screwed into the screw hole 20 of the first attachment member 14, the inner bracket 70 is fixed to the first attachment member 14, thereby being attached to the mount main unit 12. The inner bracket 70 is configured such that, in the state where the mount main unit 12 is mounted on the outer bracket 72, which will be described later, the attachment part 76 protrudes further forward than the outer bracket 72, and the connecting part 74 is inserted into an insertion hole 96 (described later) of the outer bracket 72 and fixed to the first attachment member 14.

Figure 7:
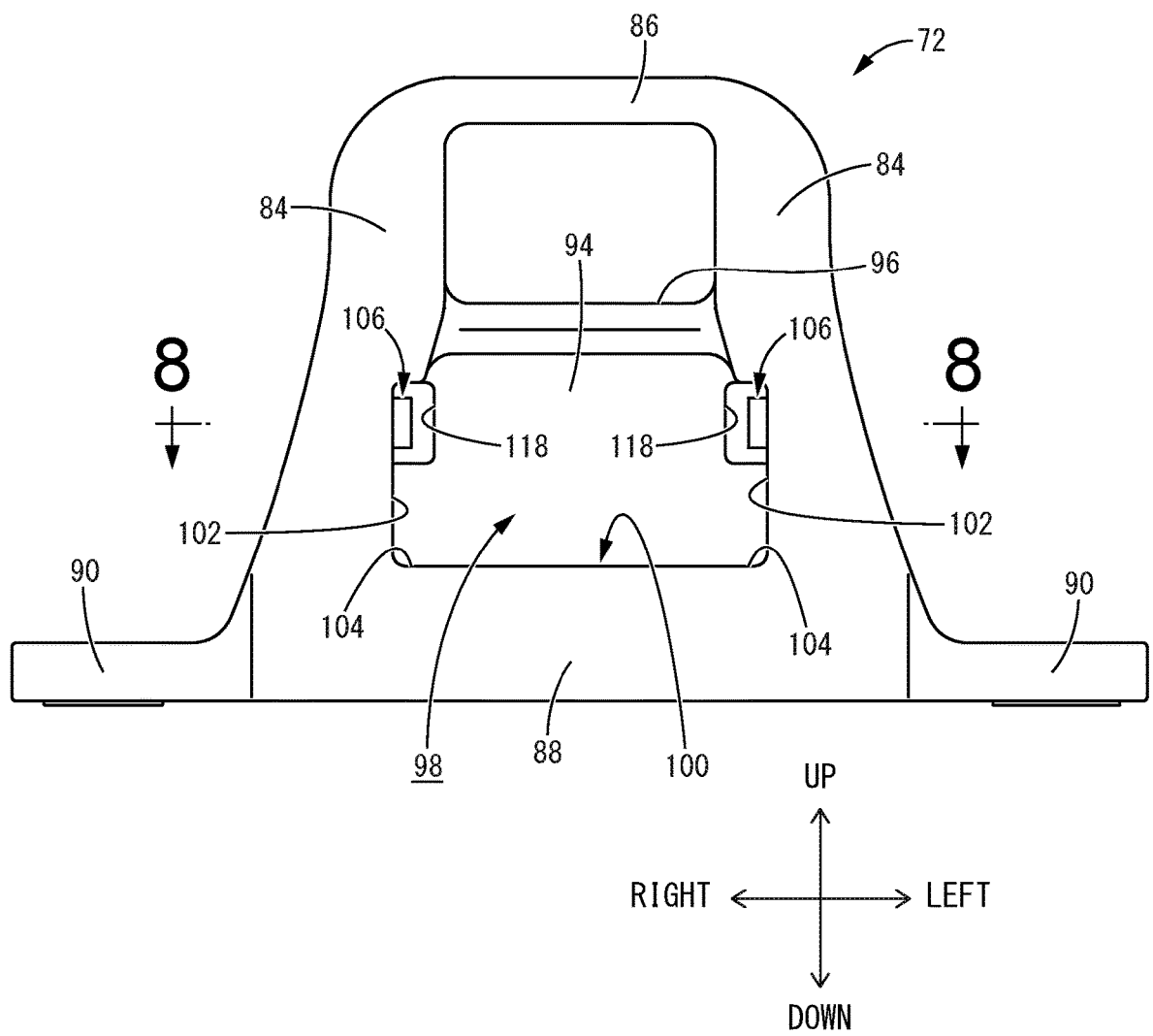
FIG. 7 is a rear view of an outer bracket constituting the engine mount shown in FIG. 1.
Figure 8:
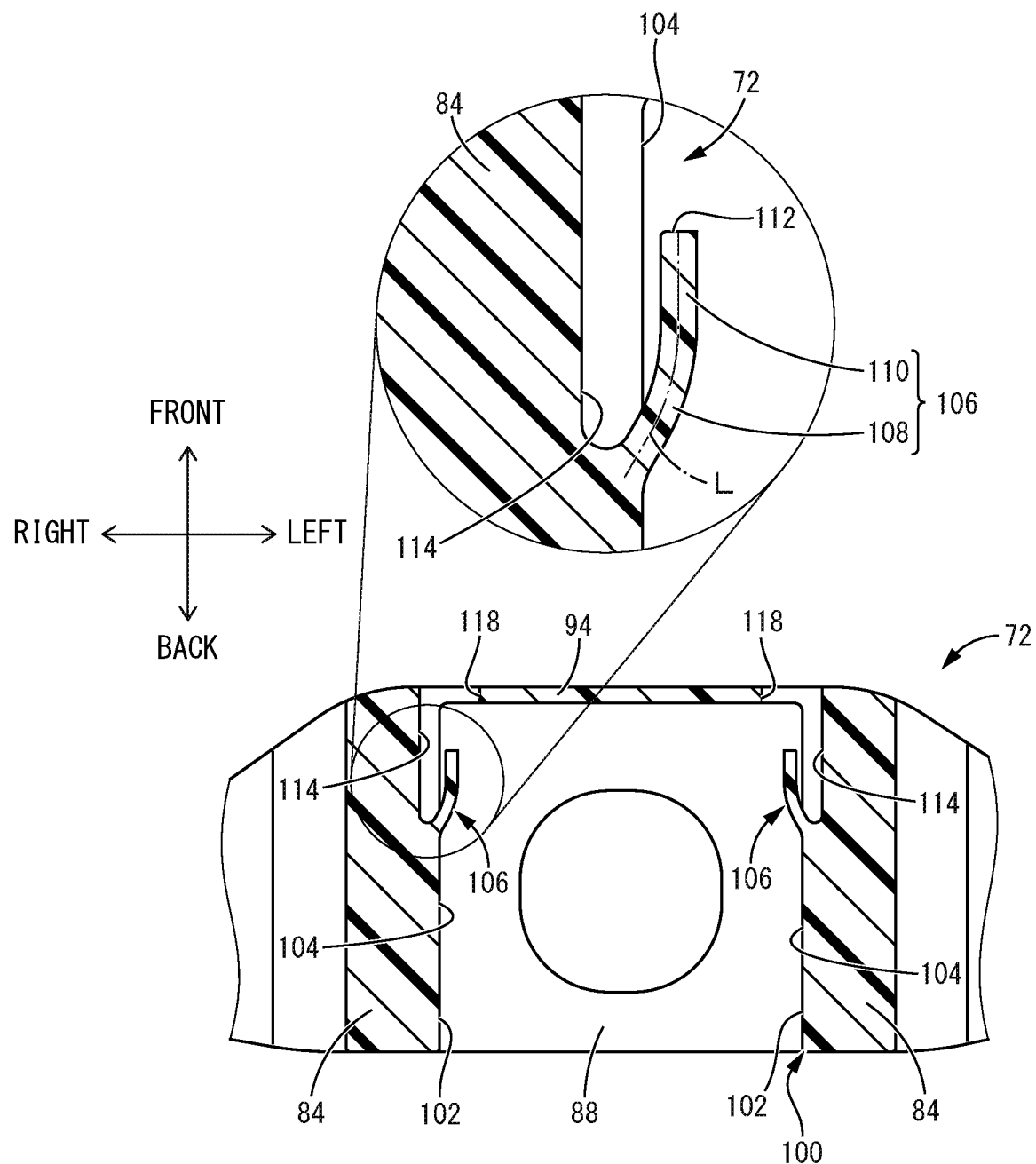
FIG. 8 is a cross-sectional view taken along line 8-8 of FIG. 7.

As shown in FIGS. 7 and 8, the outer bracket 72 includes a pair of opposed walls 84, 84. The opposed walls 84, 84 each extend in the vertical direction and are opposed to each other in the left-right direction. The upper ends of the opposed walls 84, 84 are connected to each other by an integrally formed top wall 86. The lower ends of the opposed walls 84, 84 are connected to each other by an integrally formed base wall 88. The lower ends of the opposed walls 84, 84 have respective attachment pieces 90, 90 projecting outward in the left-right direction, and the attachment pieces 90, 90 are penetrated by respective bolt holes 92, 92 in the vertical direction (see FIGS. 1 and 2).

Figure 1:
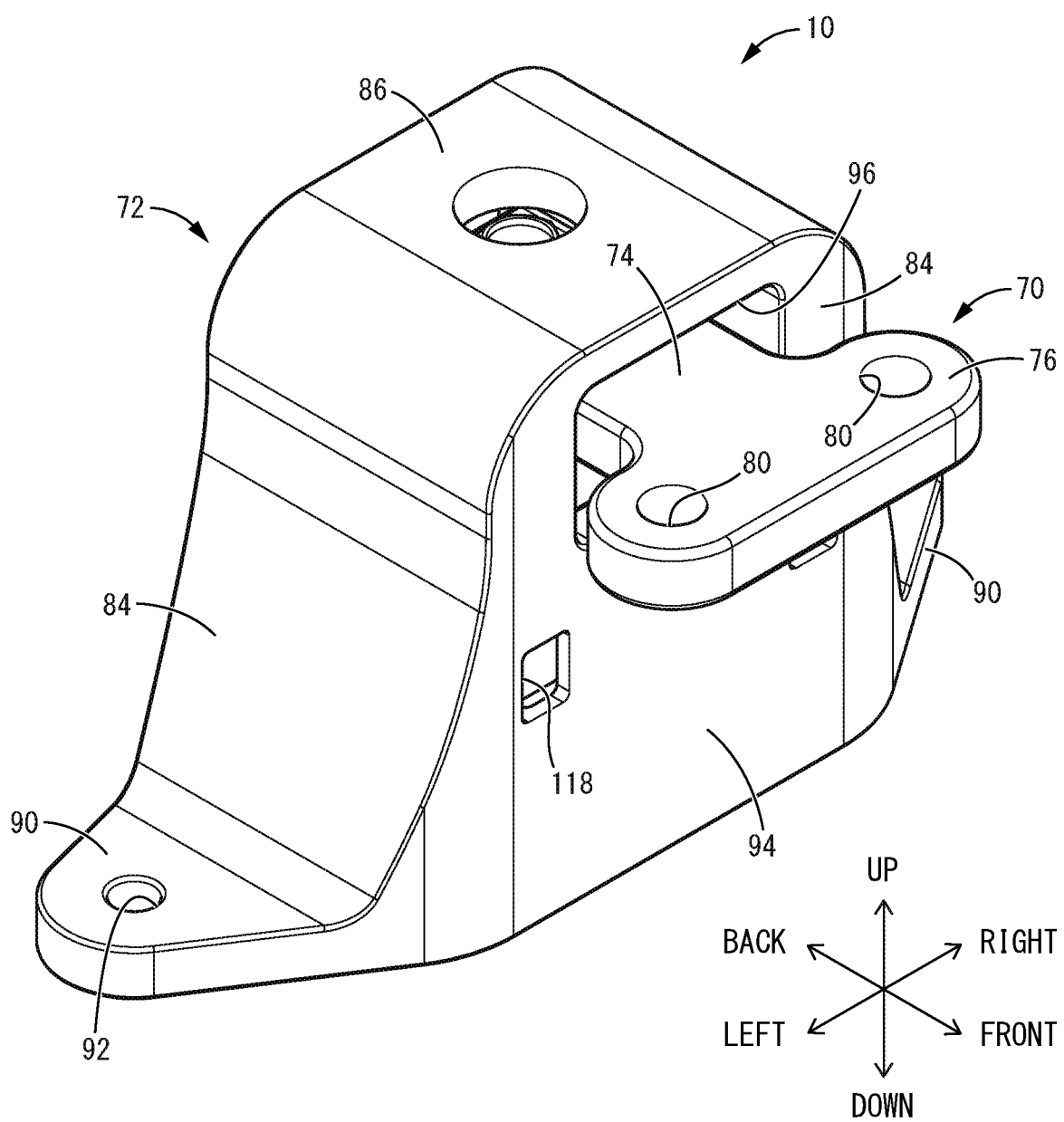
FIG. 1 is a perspective view showing a vibration damping device in the form of an engine mount according to a first practical embodiment of the present invention.
Figure 2:
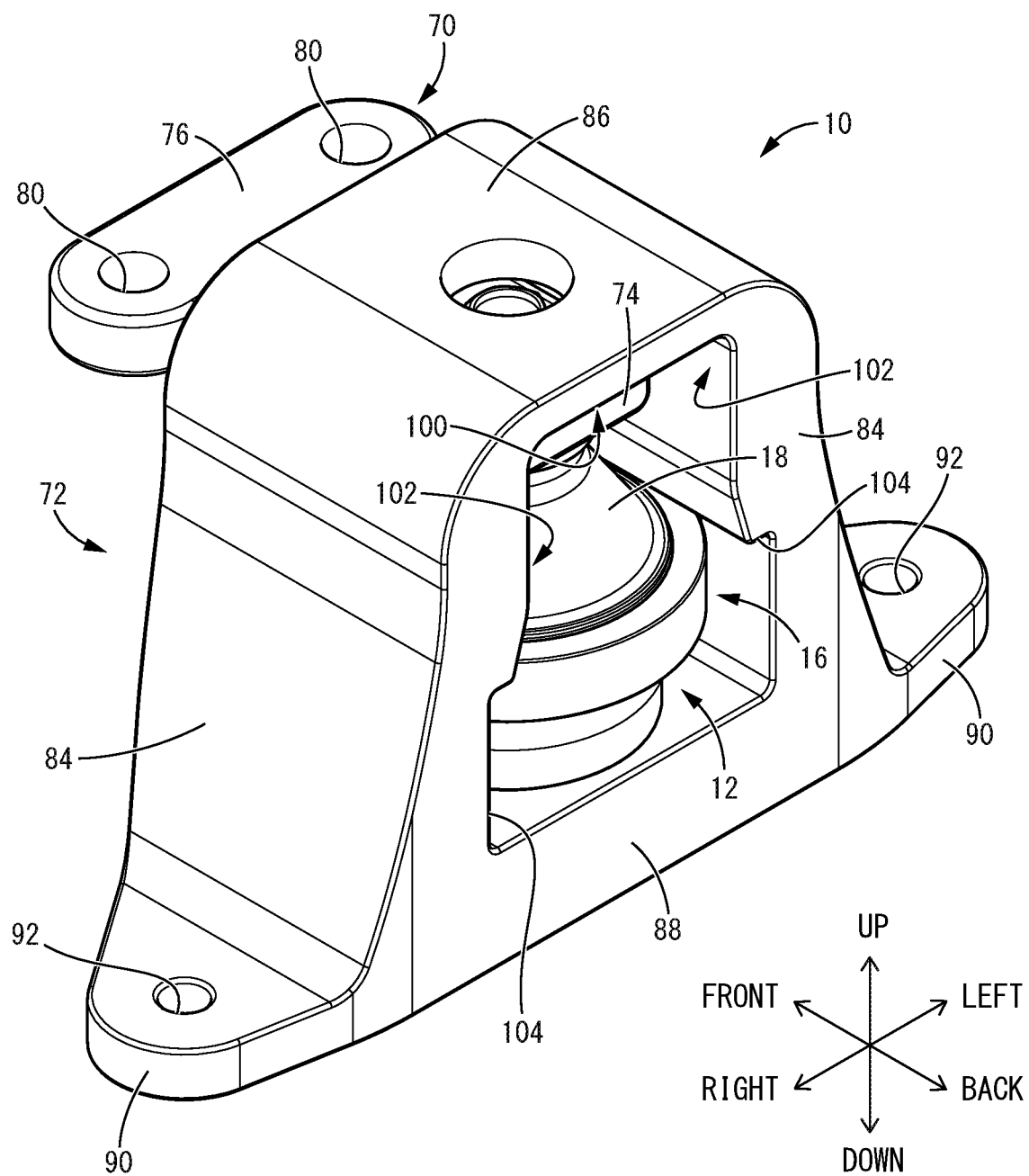
FIG. 2 is a perspective view of the engine mount shown in FIG. 1 from another angle.

As shown in FIGS. 1 and 5, the outer bracket 72 has a forward wall 94 that integrally connects the front end portions of the opposed walls 84, 84. The forward wall 94 has a plate shape that extends in an intersecting direction with respect to the front-back direction, and the left-right opposite ends are connected to the opposed walls 84, 84. The upper end of the forward wall 94 is remote from the top wall 86 to the lower side, and an insertion hole 96 penetrating in the front-back direction is formed between the forward wall 94 and the top wall 86.

In the outer bracket 72, the space enclosed by the opposed walls 84, 84, the top wall 86, the base wall 88, and the forward wall 94 serves as a mount housing space 98 in which the mount main unit 12 is housed. The mount housing space 98 has a recess shape that opens backward, and the opening to the back of the mount housing space 98 serves as an insertion opening 100 (see FIGS. 2 and 5). The mount housing space 98 opens forward through the insertion hole 96 at the upper part.

Figure 9:
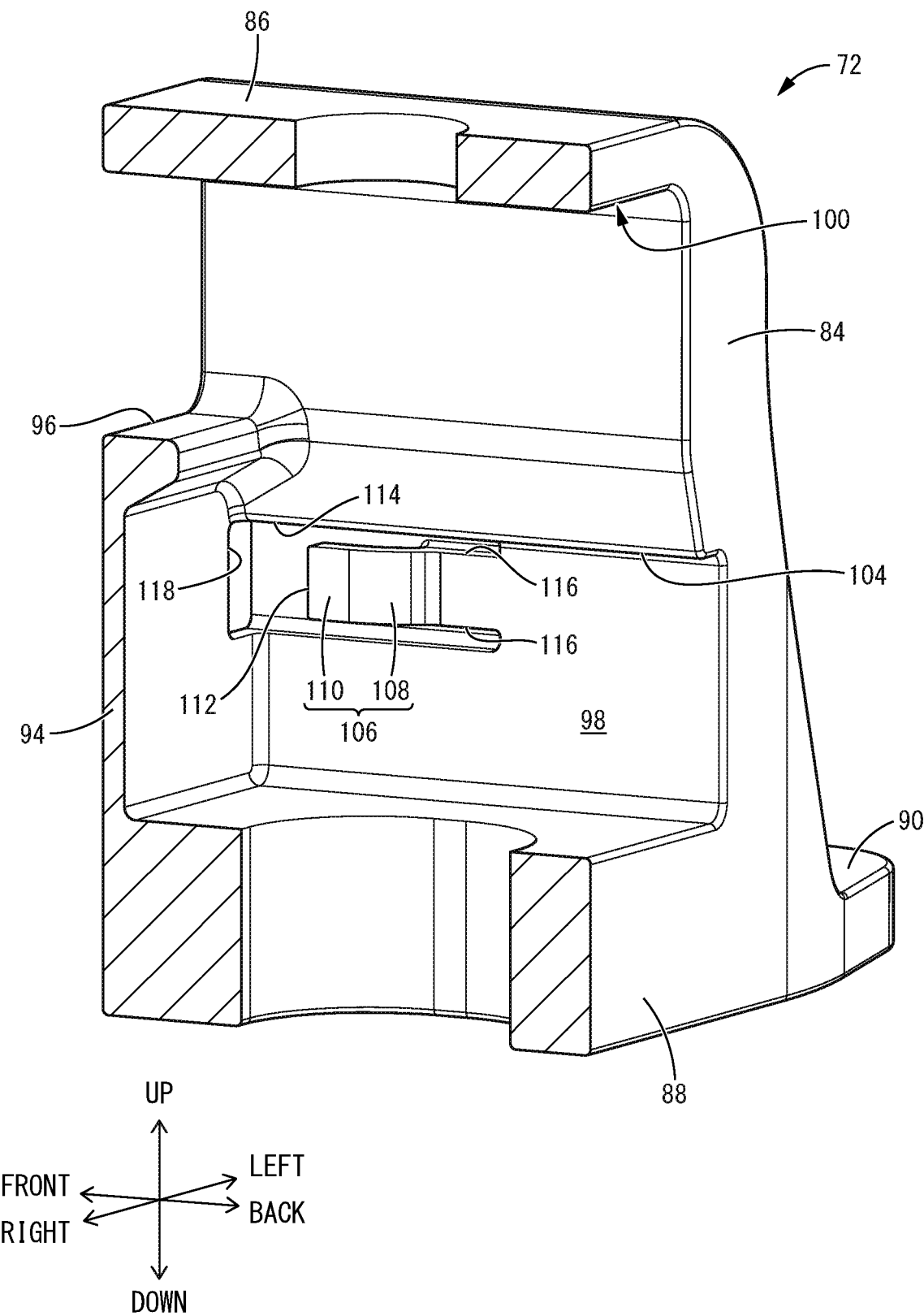
FIG. 9 is a perspective cross-sectional view of the outer bracket shown in FIG. 7.

The wall inner surfaces of the mount housing space 98, which are defined by the pair of opposed walls 84, 84, serve as opposed inner faces 102, 102. As shown in FIG. 7, fitting grooves 104, 104 open onto the respective opposed inner faces 102, 102. As shown in FIG. 9, the fitting grooves 104, 104 extend straightly in the front-back direction, and the back ends thereof reach the respective back ends of the pair of opposed walls 84, 84 and open onto the back surface of the outer bracket 72 at the insertion opening 100. In other words, the fitting grooves 104, 104 extend straightly from the insertion opening 100 toward the front, namely forward. The fitting grooves 104, 104 are provided at the respective lower parts of the pair of opposed inner faces 102, 102, so that the distance between the opposed inner faces 102, 102 in the left-right direction is larger at the lower part than at the upper part.

Each of the opposed walls 84 is integrally provided with a latch 106 extending from the opposed inner face 102. The latch 106 has a plate shape and has flexibility and elasticity in the plate thickness direction. As shown in FIGS. 8 and 9, in the latch 106 protruding from the opposed inner face 102, a proximal end portion 108 comprises a slope portion extending so as to slope inward in the left-right direction toward the front, while a distal end portion 110 extends straightly forward in the approximately front-back direction. The inner surface of the latch 106 in the left-right direction and the concave bottom face 30 of the outer recess 28 have shapes that correspond to each other. In the present practical embodiment, the distance between the opposed faces in the left-right direction of the concave bottom face 30 of the outer recess 28 and the inner surface of the latch 106 in the left-right direction is larger at the back part than at the front part (see FIG. 3). A distal end face 112 of the latch 106 is a plane that extends generally orthogonally to the front-back direction.

As shown in FIGS. 8 and 9, a clearance recess 114 is formed in the opposed inner face 102 of each opposed wall 84. The clearance recess 114 has a groove shape extending in the front-back direction, and opens onto the bottom face of the fitting groove 104 at the front portion of the fitting groove 104. The clearance recess 114 is located in front of the proximal end of the latch 106 of the opposed wall 84. The latch 106 is arranged inside in the left-right direction with respect to the clearance recess 114. The latch 106 is located inside in the left-right direction away from the portion constituted by the bottom face of the clearance recess 114 of the opposed inner face 102, and a space is provided between the latch 106 and the bottom face of the clearance recess 114. Therefore, the latch 106 is allowed to deform and move outward in the left-right direction by the clearance recess 114. As shown in FIG. 9, each opposed wall 84 of the present practical embodiment is provided with a pair of groove-shaped slits 116, 116 that are continuous with the clearance recess 114. The slits 116, 116 extend straightly from the clearance recess 114 further backward than the proximal end of the latch 106 on the vertically opposite outer sides of the latch 106.

As shown in FIG. 1, a pair of confirmation holes 118, 118 are formed in the forward wall 94. The confirmation holes 118, 118 are holes that penetrate the forward wall 94 in the front-back direction, and are arranged on the extension of the respective fitting grooves 104, 104 as shown in FIGS. 7 to 9. The vertically opposite wall inner surfaces of each confirmation hole 118 are arranged at the same position in the vertical direction with respect to the vertically opposite wall inner surfaces of the clearance recess 114. The wall inner surface of each confirmation hole 118 on the outside in the left-right direction is located at the same position in the left-right direction as the base wall inner surface of the corresponding clearance recess 114, while the wall inner surface of each confirmation hole 118 on the inside in the left-right direction is located on the inner side than the inner surface of the corresponding latch 106 in the left-right direction. This makes it possible to visually observe the latch 106 from the front through the confirmation hole 118.

As shown in FIGS. 1 to 5, the outer bracket 72 is attached to the mount main unit 12. Specifically, the mount main unit 12 is inserted forward, namely in the direction of attachment, into the mount housing space 98 of the outer bracket 72 from the insertion opening 100 at the back end. At that time, as shown in FIG. 4, regarding the second attachment member 16 of the mount main unit 12, fitting parts or fitting projections 120, 120, which are the left-right opposite end portions thereof, are inserted forward into the respective fitting grooves 104, 104 of the pair of opposed walls 84, 84 from the insertion opening 100 side. The fitting parts 120, 120 in the present practical embodiment are constituted by the left-right opposite end portions of the fastening member 22, the partition member 40, and the support member 62, which are constituent components of the second attachment member 16. Besides, the support member 62 of the second attachment member 16 is overlapped on the upper surface of the base wall 88 of the outer bracket 72 not only at the left-right opposite end portions but also at the left-right middle portion. With these arrangements, the second attachment member 16 is fixed to the outer bracket 72, and the mount main unit 12 is attached to the outer bracket 72 from the back which is generally orthogonal to the vertical direction.

By the fitting parts 120, 120 of the second attachment member 16 being fitted into the fitting grooves 104, 104, a force in the direction of approach in the vertical direction is exerted between the fastening member 22 and the support member 62. With this arrangement, the lower end of the main rubber elastic body 18 is compressed in the vertical direction between the fastening member 22 and the partition member 40, and the outer peripheral end of the flexible film 60 is compressed in the vertical direction between the partition member 40 and the support member 62. As a result, the fluid tightness at the walls of the pressure-receiving chamber 64 and the equilibrium chamber 66 is enhanced, and troubles such as liquid leakage are avoided.

By the fitting parts 120, 120 of the second attachment member 16 being fitted into the fitting grooves 104, 104, the guide surfaces 26, 26 of the fastening member 22 that constitutes the second attachment member 16 are overlapped with the respective groove bottom faces of the fitting grooves 104, 104. With this configuration, the second attachment member 16 and the outer bracket 72 are mutually positioned in the left-right direction.

As shown in FIG. 3, the latch 106 protruding from the opposed inner face 102 of the outer bracket 72 is inserted into the outer recess 28 of the second attachment member 16 by the mount main unit 12 being attached to the outer bracket 72.

Figure 10A:
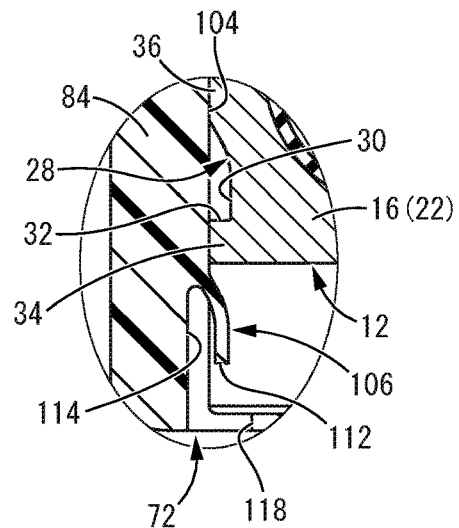
FIG. 10A is a cross-sectional view suitable for explaining a manufacturing process of the engine mount shown in FIG. 1, showing a state before a latching wall of the mount main unit climbs over a latch of the outer bracket.

Specifically, since the proximal end portion 108 of the latch 106 comprises the slope portion, the latch 106 is located on the inner side in the left-right direction than the bottom face of the fitting groove 104. Therefore, as shown in FIG. 10A, by the mount main unit 12 being inserted into the mount housing space 98 of the outer bracket 72 from the back to the front, the latching wall 34 of the second attachment member 16 comes into contact with the latch 106 of the outer bracket 72.

Figure 10B:
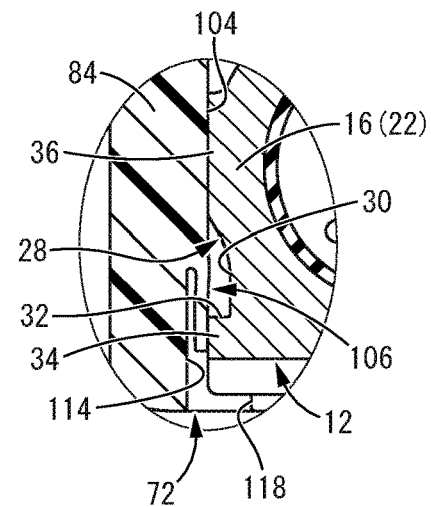
FIG. 10B is a cross-sectional view suitable for explaining the manufacturing process of the engine mount shown in FIG. 1, showing a state in the middle of the latching wall of the mount main unit climbing over the latch of the outer bracket.

As shown in FIG. 10B, by the mount main unit 12 moving further forward with respect to the outer bracket 72, the latching wall 34 climbs over the latch 106 while elastically deforming the latch 106 and pushing it outward in the left-right direction. In the present practical embodiment, the latch 106 is positioned at the clearance recess 114, and space is surely obtained outside in the left-right direction of the latch 106. Thus, when the latching wall 34 climbs over the latch 106, deformation and displacement of the latch 106 outwardly in the left-right direction is sufficiently allowed. Moreover, the provision of the clearance recess 114 enables a sufficient space to be obtained outside in the left-right direction of the latch 106 without making the slope angle of the proximal end portion 108 of the latch 106 larger than necessary, so that the latch 106 can efficiently receive the compression force to be described later.

Figure 10C:
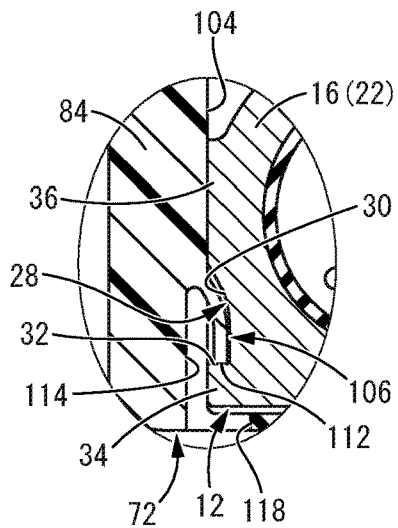
FIG. 10C is a cross-sectional view suitable for explaining the manufacturing process of the engine mount shown in FIG. 1, showing a state after the latching wall of the mount main unit climbed over the latch of the outer bracket.

When the latching wall 34 moves further forward than the latch 106, as shown in FIG. 10C, the outward force in the left-right direction that has been exerted on the latch 106 by the contact of the latching wall 34 is canceled, so that the latch 106 elastically recovers its original shape, and the latch 106 is inserted into the outer recess 28. Since the proximal end portion 108 of the latch 106 extends so as to slope inward in the left-right direction, the latch 106 is inserted into the outer recess 28 simply by moving the mount main unit 12 forward with respect to the outer bracket 72. In the present practical embodiment, it can be easily confirmed that the latch 106 is correctly inserted into the outer recess 28 by viewing from the front through the confirmation hole 118 provided to the forward wall 94 of the outer bracket 72.

The distal end face 112 of the latch 106 inserted into the outer recess 28 is overlapped with the forward wall inner face 32 of the outer recess 28. The center in the left-right direction of the distal end face 112 located on the center axis L of the latch 106 is located in the outer recess 28, and the center in the left-right direction of the distal end face 112 is overlapped with the forward wall inner face 32 of the outer recess 28. In the present practical embodiment, the entire distal end face 112 is housed in the outer recess 28 and overlapped with the forward wall inner face 32.

It is desirable that the distal end face 112 of the latch 106 be in contact with the forward wall inner face 32 of the outer recess 28 in order that the resistance to dislodgement described later can be quickly exerted, but the distal end face 112 may be overlapped so as to be opposed to the forward wall inner face 32 with a gap. The inner surface of the latch 106 in the left-right direction may touch the concave bottom face 30 of the outer recess 28, or may be in opposition thereto with a gap. It is desirable that the entire distal end face 112 of the latch 106 be housed in the outer recess 28, and it is desirable that the distal end face 112 be housed in the outer recess 28 at least on the center axis L of the latch 106 (the dot-and-dash line in FIG. 3). That is, in the present practical embodiment, it is desirable that a half or more of the distal end face 112 in the left-right direction be arranged in the outer recess 28.

When the mount main unit 12 is about to become dislodged from the outer bracket 72 through the insertion opening 100 backward opposite to the direction of attachment, the movement of the mount main unit 12 backward (in the direction of dislodgment) with respect to the outer bracket 72 is limited by the latch between the latch 106 and the forward wall inner face 32 of the outer recess 28. Specifically, when the mount main unit 12 is about to move backward relative to the outer bracket 72, the distal end face 112 of the latch 106 is pressed against and latched by the forward wall inner face 32 of the outer recess 28, and a contact reaction force is exerted on the latch 106. Due to the action of the contact reaction force, the slope angle of the proximal end portion 108, which is the slope portion, changes, and the distal end portion 110 moves inward in the left-right direction, so that the distal end portion 110 of the latch 106, which has moved inward in the left-right direction, comes into contact with the concave bottom face 30 of the outer recess 28, which constitutes a stopper face. By so doing, the movement of the distal end portion 110 of the latch 106 inward in the left-right direction is limited by the concave bottom face 30, which is the stopper face, and the further change of the slope angle of the proximal end portion 108 is limited. Due to the tilting motion of the proximal end portion 108 being limited, the contact reaction force input to the latch 106 acts primarily as a compression force in the direction of extension of the center axis L. Then, the excellent load bearing performance of the latch 106 against the compression in the direction of extension of the center axis L limits the backward movement of the second attachment member 16 relative to the outer bracket 72, thereby preventing the mount main unit 12 from becoming dislodged backward from the outer bracket 72. In this way, in the engine mount 10, the excellent load bearing capability of the latch 106 against the compression in the center axis direction can be skillfully utilized to obtain a larger resistance to dislodgement that prevents the mount main unit 12 from becoming dislodged backward from the outer bracket 72.

Since the distal end face 112 of the latch 106 and the forward wall inner face 32 of the outer recess 28 both spread orthogonally to the front-back direction, when the distal end face 112 and the forward wall inner face 32 are latched, forces in the left-right and vertical directions are less likely to act between the distal end face 112 and the forward wall inner face 32. Therefore, the force in the orthogonal direction is efficiently applied to the distal end face 112 of the latch 106, thereby efficiently obtaining the resistance to dislodgement in the front-back direction.

The distal end portion 110 of the latch 106 extends in the front-back direction, and the distal end face 112 of the latch 106 and the forward wall inner face 32 of the outer recess 28 both spread generally orthogonally to the front-back direction. With this configuration, the direction of the force exerted on the latch 106 by contact and latch of the distal end face 112 with the forward wall inner face 32 approximately coincides with the direction of extension of the center axis L at the distal end portion 110 of the latch 106. Therefore, the force due to the latch between the latch 106 and the forward wall inner face 32 is more efficiently exerted on the latch 106 as a compression force in the direction of extension of the center axis L.

At the distal end face 112 of the latch 106, the center axis L is located within the outer recess 28. With this configuration, the moment caused by the contact reaction force acting on the latch 106 is reduced, and the contact reaction force is more efficiently exerted on the latch 106 as a compression force, so that the resistance to dislodgement is efficiently exhibited. In the present practical embodiment, the opposite ends in the left-right direction of the distal end face 112 of the latch 106 are both located within the outer recess 28, so that the entire distal end face 112 is housed in the outer recess 28. With this arrangement, the distal end face 112 of the latch 106 is in contact with and latched by the forward wall inner face 32 of the outer recess 28 over a wide area, thereby efficiently obtaining the resistance to dislodgement.

The stopper face, which limits the deformation of the latch 106 by coming into contact with the latch 106, is constituted by the concave bottom face 30 of the outer recess 28. Since the concave bottom face 30 of the outer recess 28 has a shape that corresponds to the inner surface of the latch 106 in the left-right direction, the latch 106 inserted into the outer recess 28 comes into contact with the concave bottom face 30 constituting the stopper face over a wide area. Therefore, the resistance to dislodgement due to stress against the compressive load of the latch 106 is efficiently manifested, thereby avoiding damage to the latch 106 caused by its excessive deformation.

In the latch 106, the distal end portion 110 extending so as not to slope with respect to the front-back direction and the proximal end portion 108 extending so as to slope with respect to the front-back direction are smoothly continuous with each other, and no corners or unevenness are formed on the outer surface at their boundary part. Therefore, when a force is transmitted from the distal end portion 110 to the proximal end portion 108 in the direction of the extension of the center axis L, local stress concentration is avoided, thereby avoiding damage to the latch 106 or the like.

The latch 106 is provided in the middle of the outer bracket 72 in the front-back direction. Thus, in the isolated state of the outer bracket 72 to which the mount main unit 12 is not attached, damage to the latch 106 is prevented. In particular, since the forward wall 94 is provided at the front end portion of the outer bracket 72, the front of the latch 106 is covered and protected by the forward wall 94, thereby more effectively preventing damage to the latch 106.

A practical embodiment of the present invention has been described in detail above, but the present invention is not limited to those specific descriptions. For example, the specific shape of the latch can be changed as appropriate. Specifically, for example, the latch is not limited to a plate shape as shown in the preceding practical embodiment, but may have a rod shape or the like. In addition, it would also be possible to provide a plurality of latches in sequence in the vertical direction, in a parallel arrangement. Besides, any of latches 130, 140, 150 according to the second to fourth practical embodiments shown in FIGS. 11 to 13 described below may be adopted.

Figure 11:
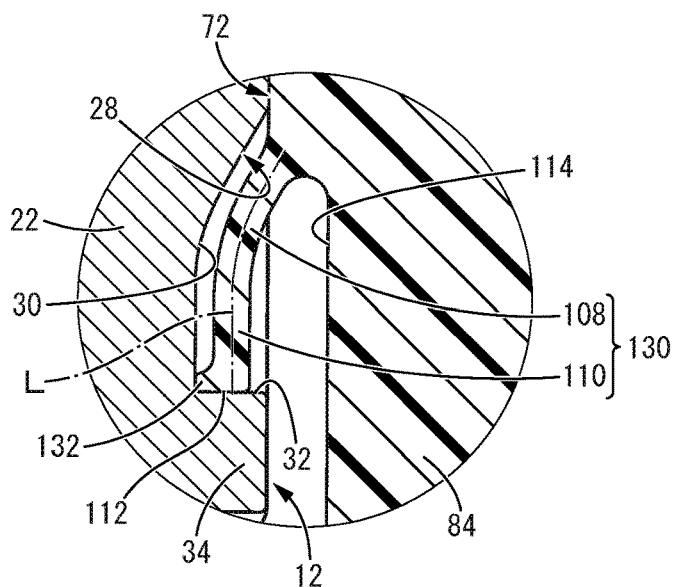
FIG. 11 is a cross-sectional view showing a part of an engine mount according to a second practical embodiment of the present invention.

The latch 130 shown in FIG. 11 include a projection 132 projecting from the distal end toward the inner side in the left-right direction (the left side in FIG. 11), which is the concave bottom side of the outer recess 28. In addition to the distal end face 112 of the latch 130, the projection 132 is latched by the forward wall inner face 32 of the outer recess 28, so that the mount main unit 12 is more effectively prevented from becoming dislodged from the outer bracket 72.

Figure 12:
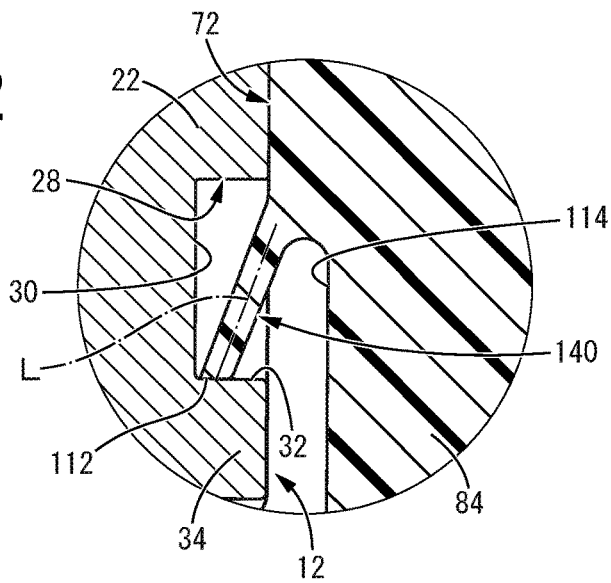
FIG. 12 is a cross-sectional view showing a part of an engine mount according to a third practical embodiment of the present invention.

The latch 140 shown in FIG. 12 comprises the slope portion in its entirety that slopes with respect to the front-back direction. Thus, the latch does not have to include a portion extending parallel to the front-back direction. As shown in FIG. 12, the concave bottom face 30 of the outer recess 28 is not necessarily limited to a shape corresponding to the inner surface of the latch 140 in the left-right direction (the right side surface in FIG. 12), but may have a shape that is different from the inner surface of the latch 140 in the left-right direction.

Figure 13:
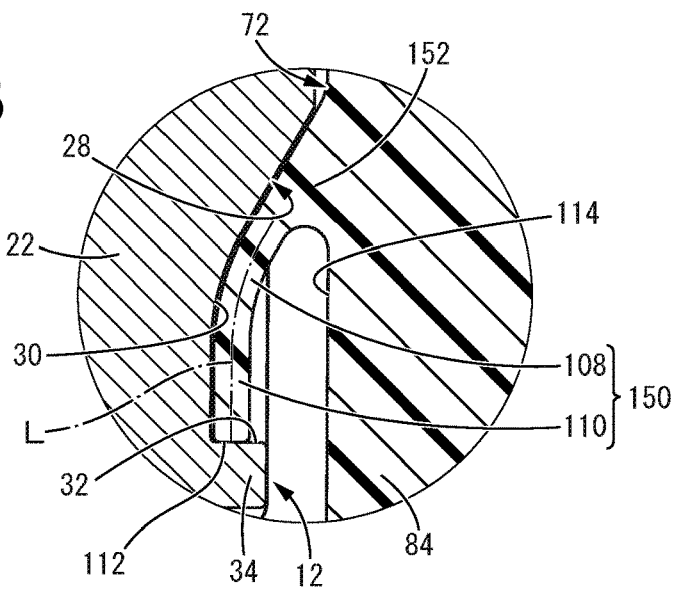
FIG. 13 is a cross-sectional view showing a part of an engine mount according to a fourth practical embodiment of the present invention.

The latch 150 shown in FIG. 13 is made thicker in a proximal end 152 than in the distal end portion 110. This improves strength at the proximal end 152 of the latch 150 where stress concentration is likely to occur. Since the distal end portion 110 of the latch 150 is thinner than the proximal end 152, the distal end portion 110 readily deforms. Thus, the latching wall 34 of the outer recess 28 can easily climb over the latch 150, thereby facilitating the attachment of the mount main unit 12 to the outer bracket 72.

The distal end face 112 of the latch 106 and the forward wall inner face 32 of the outer recess 28 may both slope with respect to the direction of attachment of the mount main unit 12 with the outer bracket 72. When the distal end face 112 and the forward wall inner face 32 slope with respect to the direction of attachment in this way, it is preferable that the slope angle is set so that the distal end face 112 and the forward wall inner face 32 come into planar contact with each other.

In the preceding practical embodiment, the outer recess 28 has a groove shape penetrating the fastening member 22 in the vertical direction. However, the outer recess 28 may have a recess shape provided in the vertically middle portion of the fastening member 22. In this case, the guide surface 26 of the fastening member 22 may be overlapped with the groove bottom face of the fitting groove 104 on opposite sides which are vertically outside the outer recess 28.

The specific structure for fixing the second attachment member 16 and the outer bracket 72 is not necessarily limited to the structure of the preceding practical embodiment. Specifically, in the preceding practical embodiment, the left-right opposite end portions of the fastening member 22, the partition member 40, and the support member 62, which constitute the second attachment member 16, serve as the fitting parts 120, 120 to be fitted into the fitting grooves 104, 104. However, for example, only the left-right opposite end portions of the fastening member 22 may serve as the fitting parts to be fitted into the fitting grooves.

Besides, in the preceding practical embodiment, the fitting parts 120, 120 of the second attachment member 16 and the inner faces of the fitting grooves 104, 104 of the outer bracket 72 are fitted so as to be in direct contact with each other. However, for example, a rubber elastic body may be fastened to the fitting parts 120, 120 of the second attachment member 16 or the like, so that the fitting parts 120, 120 of the second attachment member 16 and the inner faces of the fitting grooves 104, 104 of the outer bracket 72 are in indirect contact via the rubber elastic body. In this way, by interposing a rubber elastic body between the fitting parts 120, 120 of the second attachment member 16 and the inner faces of the fitting grooves 104, 104 of the outer bracket 72, it is possible to achieve effects of reducing variations in the fixing force due to component dimensional errors, reducing variations in the force required for attachment of the mount main unit 12 to the outer bracket 72, and the like. In the case where a rubber elastic body is provided to the fitting parts 120, 120, the rubber elastic body may be independent of the main rubber elastic body 18, or may be integrally formed with the main rubber elastic body 18.

While the preceding practical embodiment illustrates the vibration-damping device main unit of a fluid-filled type, the vibration-damping device main unit may be, for example, a solid type that is not a fluid-filled type.

What is claimed is:

1. A vibration damping device comprising:
   a vibration-damping device main unit comprising a first attachment member and a second attachment member connected by a main rubber elastic body;
   a bracket attached to the vibration-damping device main unit and including a pair of opposed walls provided on opposite sides in a width direction of the bracket;
   a pair of fitting grooves provided to the respective opposed walls of the bracket; and
   a pair of fitting parts provided on opposite sides in a width direction of the second attachment member, the fitting parts being fitted in the respective fitting grooves such that the vibration-damping device main unit is attached to the bracket from a lateral side, wherein the bracket includes latches having flexibility and respectively extending from opposed inner faces of the respective opposed walls forward in a direction of attachment of the vibration-damping device main unit to the bracket, the second attachment member includes outer recesses respectively opening onto surfaces overlapped with the respective opposed walls, each of the latches has a slope portion sloping inward in the width direction of the bracket toward a distal end of the latch such that a distal end face of the latch is inserted in the corresponding outer recess, and the distal end face of the latch is latched by a forward wall inner face of the corresponding outer recess, and displacement of the second attachment member relative to the bracket in a direction of dislodgment opposite to the direction of attachment is limited.

2. The vibration damping device according to claim 1, wherein a distal end portion of each latch extending from the corresponding opposed wall extends straightly forward parallel to the direction of attachment, and a proximal end portion of the latch comprises the slope portion.

3. The vibration damping device according to claim 1, wherein a clearance recess is provided to a bottom face of each of the fitting grooves of the respective opposed walls, and each latch is positioned at the clearance recess.

4. The vibration damping device according to claim 1, wherein each latch is made thicker in a proximal end on a side of the corresponding opposed wall than in the distal end.

5. The vibration damping device according to claim 1, wherein a stopper face configured to limit an amount of deformation of each latch due to contact of the latch is constituted by a concave bottom face of the corresponding outer recess.

6. The vibration damping device according to claim 1, wherein the distal end of each latch has a projection projecting toward a concave bottom side of the corresponding outer recess, and in addition to the distal end face of the latch, the projection is latched by the forward wall inner face of the corresponding outer recess.

7. The vibration damping device according to claim 1, wherein the distal end face of each latch is latched by the forward wall inner face of the corresponding outer recess on a center axis of the latch.

\* \* \* \* \*